United States Patent
Nishikawa et al.

(10) Patent No.: US 6,804,069 B2
(45) Date of Patent: Oct. 12, 2004

(54) MAGNETIC TRANSFER METHOD TO PREVENT DROPOUT OF SERVO SIGNAL

(75) Inventors: Masakazu Nishikawa, Odawara (JP); Seiichi Watanabe, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 241 days.

(21) Appl. No.: 09/942,765

(22) Filed: Aug. 31, 2001

(65) Prior Publication Data

US 2002/0051306 A1 May 2, 2002

(30) Foreign Application Priority Data

Sep. 4, 2000 (JP) ........................................ 2000-266697

(51) Int. Cl.$^7$ .............................................. G11B 5/86
(52) U.S. Cl. .................................................... 360/17
(58) Field of Search ............................. 360/15, 16, 17, 360/31, 25, 77.08, 75, 60, 131, 135; 369/84; 428/694 BR

(56) References Cited

U.S. PATENT DOCUMENTS 3,869,711 A * 3/1975 Bernard ........................ 360/17
6,469,848 B1 * 10/2002 Hamada ....................... 360/17

FOREIGN PATENT DOCUMENTS

| EP | 09-15456 A | 5/1999 |
|---|---|---|
| JP | 63-183623 A | 7/1988 |
| JP | 10-040544 A | 2/1998 |
| JP | 10-269566 A | 10/1998 |

* cited by examiner

Primary Examiner—Alan T. Faber
(74) Attorney, Agent, or Firm—Sughrue Mion, PLLC

(57) ABSTRACT

The present invention provides a magnetic transfer method for transferring information by bringing a master carrier for magnetic transfer and a slave medium into close contact with each other and by applying a magnetic field for magnetic transfer, said master carrier of magnetic transfer comprising servo areas to be transferred from the master carrier to the slave medium and data areas not to be transferred, both on the same plane.

16 Claims, 3 Drawing Sheets

(A)

(B)

MAGNETIC TRANSFER METHOD TO PREVENT DROPOUT OF SERVO SIGNAL

BACKGROUND OF THE INVENTION

The present invention relates to a magnetic transfer method for transferring a recorded information to a magnetic recording medium used in a magnetic recording and reproducing system of large capacity and high recording density. In particular, the invention relates to a magnetic transfer method used in the recording of servo signal, address signal and other normal signal such as video signal, audio signal, data signal, etc. to a magnetic recording medium of large capacity and high recording density.

With rapid progress in the utilization of digital image, the amount of information to be handled in devices such as personal computer is now extensively increased. With the increase of the amount of information to be handled, there are now strong demands on a magnetic recording medium, which has large capacity for information recording and can be produced at low cost, and which requires shorter time for recording and reading.

In a high-density recording medium such as hard disk or large-capacity removable type magnetic recording medium such as ZIP (Iomega Inc.), information recording area has narrower tracks compared with floppy disk. In order that a magnetic head scans over tracks with narrow width and signals are recorded and reproduced at high S/N ratio, it is necessary to perform accurate scanning using tracking servo technique.

In this respect, in a large-capacity magnetic recording medium such as hard disk, removable type magnetic recording medium, etc., there are provided areas where servo signal for tracking, address information signal, reproduction clock signal, etc. are recorded at a given angular distance with respect to one turn of the disk. The magnetic head reproduces these signals at a given spacing and scans accurately over the tracks while confirming and correcting the position of the head. These signals are recorded on the magnetic recording medium in advance when the magnetic recording medium is manufactured, and it is called "pre-format".

Accurate positioning is required for the recording of servo signal for tracking, address information signal, reproduction clock signal, etc., and the pre-format recording is generally practiced by the magnetic head under strict position control using a special-purpose servo recording system after the magnetic recording medium has been incorporated in the drive.

However, in the pre-format recording of servo signals, address information signal, reproduction clock signal, etc. by the magnetic head, recording is performed under strict position control of the magnetic head using a special-purpose servo recording system, and recording is performed one by one and track by track. Thus, long time is required for the pre-format recording. Also, with rapid increase of magnetic recording density, the amount of signals to be recorded in the pre-format recording is increased, and this means that still more time is required. The cost required for the pre-format recording process of signals such as servo signal in total manufacturing cost is increased in the production of the magnetic recording medium, and there are now strong demands on the reduction of the cost in this process.

On the other hand, a method has been proposed, in which the pre-format information is not recorded track by track, but it is transferred from the master carrier to the slave medium by magnetic transfer. For instance, such transfer technique is described in JP-63183623(A), JP-10040544(A), (EP-0915456) and JP-10269566(A).

According to the method described in JP-10040544(A) or JP-10269566(A), convex and concave portions to correspond to information signals are formed on the surface of the substrate used as the master carrier for magnetic transfer. Ferromagnetic thin film is formed at least on the surface of the convex portions. The surface of this master carrier is brought into contact with the surface of a sheet-type or a disk-type magnetic recording medium where a coating layer containing ferromagnetic thin film or ferromagnetic power is formed. Or, AC bias magnetic field or DC magnetic field is applied, and the ferromagnetic material on the surface of convex portion is excited. As a result, magnetized pattern corresponding to convex and concave portion is recorded on the magnetic recording medium.

According to this method, the surface of convex portion of the master carrier for magnetic transfer is brought into close contact with the magnetic recording medium to be pre-formatted, i.e. the slave medium, and the ferromagnetic material in the convex portion is excited. Then, a given pre-format information is recorded on the slave medium. Static recording can be carried out without changing relative position of the master carrier for magnetic transfer and the slave medium. Accurate pre-format recording can be achieved, and the time required for the recording is very short.

In the magnetic transfer method as described above, the master carrier for magnetic transfer and the slave medium are brought into close contact with each other in static state, and magnetic transfer is performed. Therefore, damage occurs less frequently on the master carrier for magnetic transfer and the slave medium in the process of servo signal recording, and high durability can be expected in this method.

However, when the master carrier for magnetic transfer and the slave medium are brought into contact with each other and magnetic field is applied for magnetic transfer and this process is repeatedly carried out, signal dropout may occur. Thus, the signal recorded in the servo areas does not fulfill the function of the servo signal. As a matter of fact, this cannot be used as a magnetic recording medium.

After performing analysis on signal dropout, it was found that the signal dropout is usually caused due to poor adhesion between the master carrier for magnetic transfer and the slave medium.

It is an object of the present invention to provide a magnetic transfer method, by which it is possible to accurately transfer servo signal to the slave medium without resulting in dropout of some of the signal in a process to form servo areas on the slave medium. This is an indispensable process in the magnetic transfer from the master carrier to the slave medium and in the use of the slave medium as a large-capacity magnetic recording medium.

SUMMARY OF THE INVENTION

The present invention provides a magnetic transfer method for transferring information by bringing a master carrier for magnetic transfer and a slave medium into close contact with each other and by applying a magnetic field for magnetic transfer, said master carrier of magnetic transfer comprising servo areas to be transferred from the master carrier to the slave medium and data areas not to be transferred, both on the same plane.

The present invention provides a magnetic transfer method as described above, wherein average surface roughness (Ra) of the data area of the master carrier for magnetic transfer is in the range of 0.1–5 nm.

Also, the present invention provides a magnetic transfer method as described above, wherein there are provided grooves in the data areas.

DESCRIPTION OF THE PREFERRED EMBODIMENT

Figure 1:
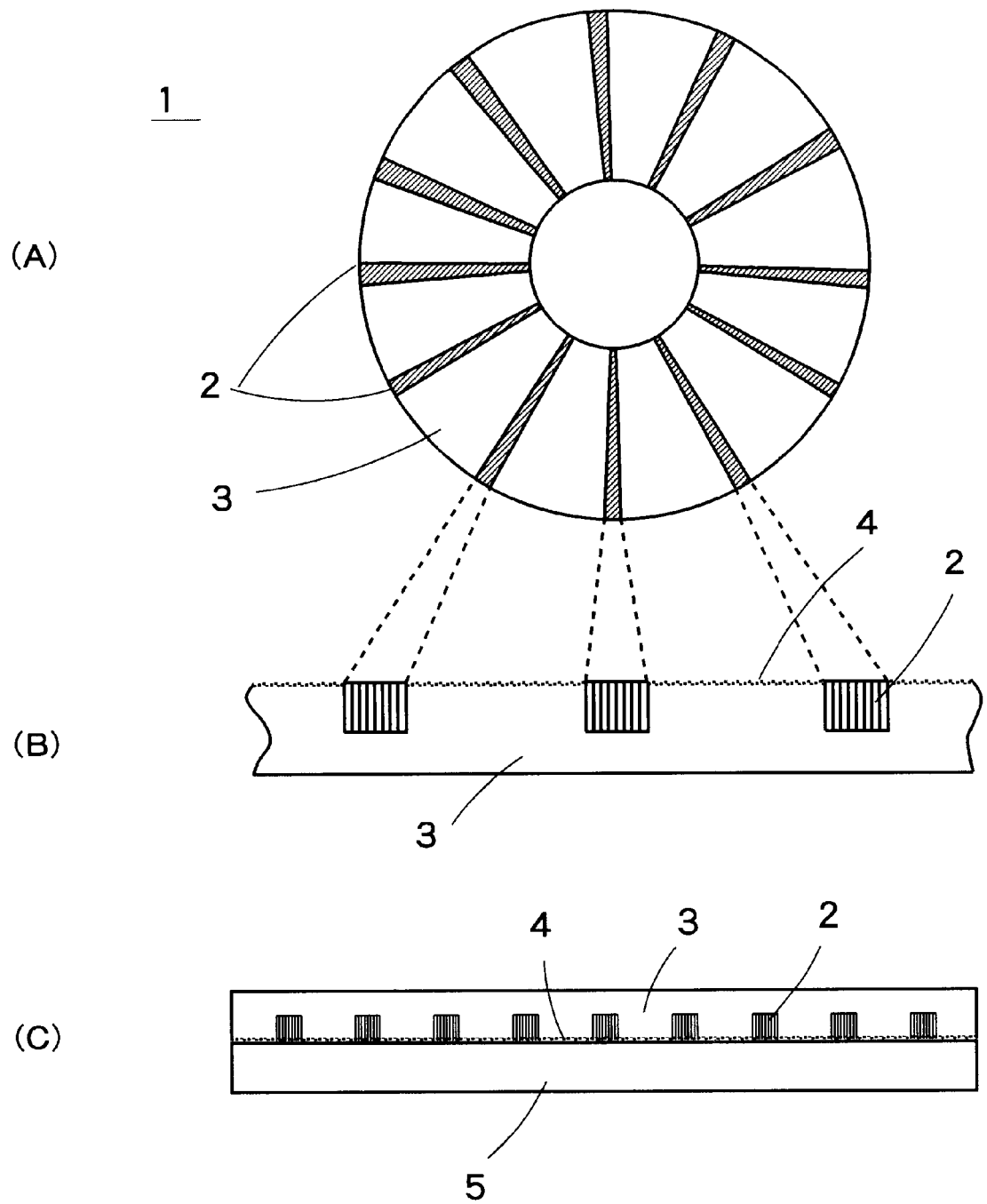
FIG. 1 represents drawings to explain a master carrier for magnetic transfer to be used in the magnetic transfer method of the present invention.

The magnetic transfer method according to the present invention is used to prevent dropout of servo signal due to poor adhesion when a master carrier for magnetic transfer and a slave medium are brought into close contact with each other and a servo signal is transferred from the master carrier for magnetic transfer to the slave medium by applying magnetic field for transfer.

Description will be given below on the present invention referring to the drawings.

FIG. 1 represents drawings to explain a master carrier for magnetic transfer to be used in the magnetic transfer method of the present invention. FIG. 1(A) is a plan view, FIG. 1(B) is a partial cross-sectional view, and FIG. 1 (C) is a cross-sectional view to explain when the master carrier for magnetic transfer and the slave medium are brought into close contact with each other.

In servo areas 2, servo signals of a master carrier for magnetic transfer 1 are distributed regularly on the surface of a magnetic recording medium. In general, the servo areas occupy less than 10% of total area of the magnetic recording medium. When a signal is transferred to form servo areas on the master carrier for magnetic transfer, if the servo area of the master carrier for magnetic transfer is brought into close contact with the surface of the slave medium, there is no need to closely fit the data area to the slave medium.

Therefore, the data area may be formed in any of concave or convex shape. A data area 3 of the master carrier for magnetic transfer occupies 90% or more of the area of the master carrier for magnetic transfer. Accordingly, it is designed in such manner that the data area is brought into contact with the surface of the slave medium during magnetic transfer of the servo signal, and when the master carrier for magnetic transfer and the slave medium are closely put together, the generated force is dispersed. As a result, durability of the magnetic layer in the servo area of the master carrier for magnetic transfer is improved.

However, by designing the data in convex form and by arranging this on the same plane as the servo area, it is possible to improve durability of the servo area of the master carrier for magnetic transfer. On the other hand, signal dropout occurs in the servo signal, which has been formed on the slave medium after magnetic transfer, and problems often arise in the quality of the magnetic transfer.

The present inventors have investigated the causes of these problems. When data area on the master carrier for magnetic transfer is designed in convex shape and it is arranged on the same plane as the slave area, contact area of the master carrier with slave medium is increased. When the master carrier for magnetic transfer is tightly fitted to the slave medium and pressure is applied, air gaps are generated between the master carrier for magnetic transfer and the slave medium. As a result, adhesion or fitness between these two components is partially decreased, and this exerts influence on the adhesion of the servo signal area. Thus, dropout of the transfer signal may occur. Even in the area where air gap is not generated, adsorption force is increased because the master carrier and the slave medium are in contact with each other over a wide area. As a result, after the completion of magnetic transfer, it requires strong force to detach or peel off the slave medium from the master carrier for magnetic transfer.

In this respect, it is necessary to ensure smooth inflow and outflow of the air over the wide contact area between the master carrier and the slave medium. FIG. 1 (B) shows a partial cross-section of the master carrier for magnetic transfer. Rough surface portions 4 with surface roughness are provided on the surface of a data area 3. When the master carrier 1 is brought into close contact with the slave medium 5 as shown in FIG. 1(C), adhesion or fitness is not decreased on the slave area, and no air gap is generated between the two components, and this makes much easier to peel off one from the other.

When surface roughness of the data area on the master carrier for magnetic transfer is set to average surface roughness (Ra) in the range of 0.2–5 nm, adsorption force between the two components can be decreased. When Ra is less than 0.2 nm, adsorption force is increased, and the slave medium cannot be easily detached. When it is 5 nm or more, distance between the master carrier and the slave medium is too wide, and this may lead to poor transfer quality of servo signal.

Figure 2:
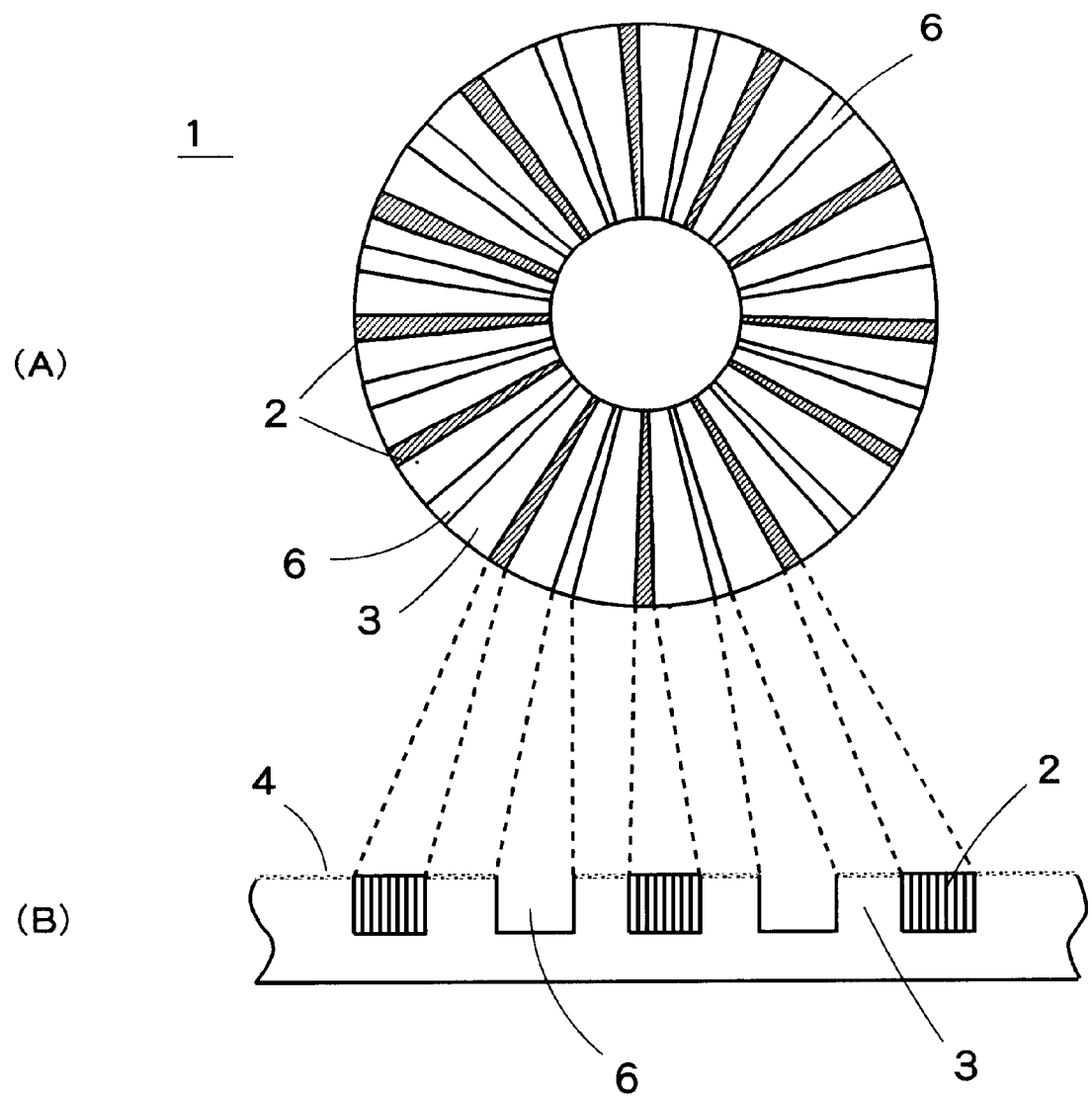
FIG. 2 represents drawings to explain another example of a master carrier for magnetic transfer to be used in the magnetic transfer method of the present invention.

FIG. 2 shows another example of the master carrier for magnetic transfer used in the magnetic transfer method of the present invention. FIG. 2(A) is a plan view, and FIG. 2 (B) is a partial cross-sectional view.

In the master carrier 1 shown in FIG. 2, the data area 3 is designed to be on the same plane as the servo area 2. Surface roughness of the data area is set to a predetermined value, and radial grooves 6 are provided on the data area 3. By the formation of these grooves, the problem of air gap can be extensively improved. The depth of the groove is preferably in the range of 50–800 nm. The width of the groove is preferably in the range of 10–100 μm.

Figure 3:
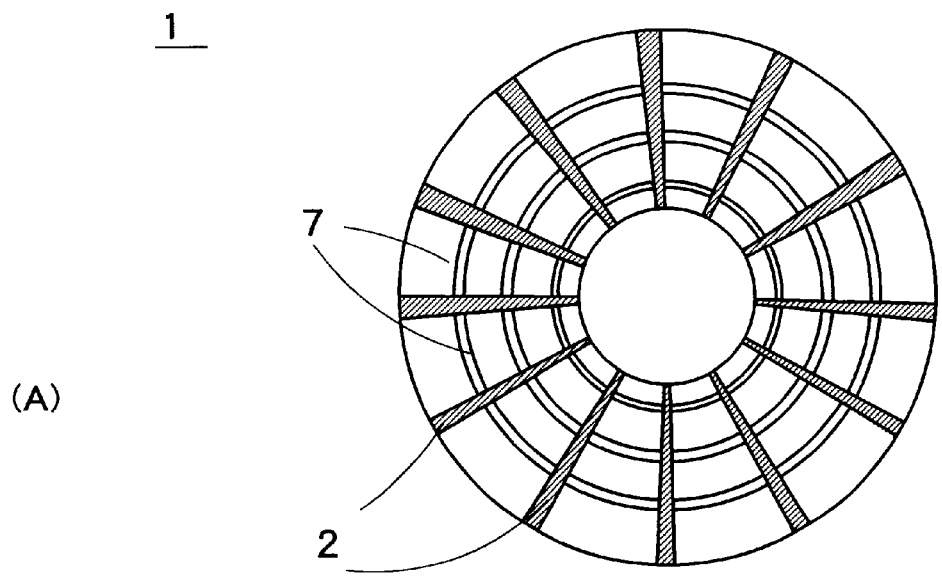
FIG. 3 represents plan views to explain still another example of the master carrier for magnetic transfer to be used in the magnetic transfer method of the present invention.
Figure 3:
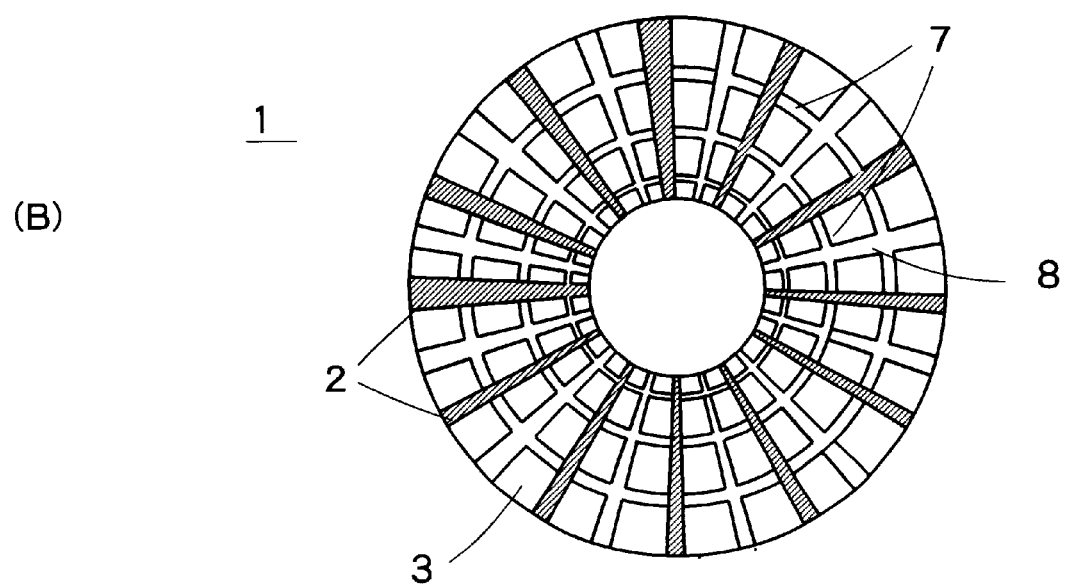

FIG. 3 represents plan views of still another example of the master carrier for magnetic transfer used in the magnetic transfer method of the present invention.

As shown in FIG. 3(A), servo areas 2 with recorded servo signals arranged on the master carrier 1 are formed on the same plane as data area 3, and surface roughness of the data area is set to a predetermined value. Then, concentric grooves 7 are formed on data signal areas of the master carrier for magnetic transfer. This makes it possible to prevent formation of air gaps because air is discharged when the master carrier and the slave medium are brought into close contact with each other in the data signal area, which occupies more than 90% of the area of the master carrier for magnetic transfer.

Further, as shown in FIG. 3(B), connecting radial grooves 8 for connecting the concentric grooves are provided in addition to the concentric grooves 7, and this ensures more perfect discharge of the air when the two components are brought into contact.

To form the master carrier for magnetic transfer of the present invention, various methods can be used: photo-fabrication method to perform photo-lithography on a substrate, and a method used for manufacture of a stamper to produce CD-ROM, i.e. a method to form a member for substrate by electroforming on a pattern produced by laser irradiation.

When it is manufactured by photo-fabrication, a nonmagnetic material such as silicon, quartz, glass, aluminum, synthetic resin, etc. with a predetermined surface roughness is used as a substrate, and a magnetic layer is formed on it. Surface roughness of the substrate can be adjusted by polishing with abrasive material, or by treatment using a chemical such as hydrofluoric acid.

More concretely, a photoresist is coated on the substrate, and a resist pattern to match the pattern formed by magnetic transfer is provided by pattern exposure or directly by marking-off.

In case of the pattern exposure, the pattern is formed on the substrate by reactive etching, or by physical etching using argon plasma or the like, or by chemical etching using etching solution.

Next, after forming a primer layer with a predetermined thickness by sputtering method, a magnetic material is formed as a magnetic layer.

Then, the photoresist is removed by lift-off method. It may be designed in such manner that only convex magnetic layer to be in contact with the slave medium in the magnetic transfer may be formed by photo-fabrication.

For the formation of the magnetic layer, it is preferable to provide a nonmagnetic primer layer giving magnetic anisotropy as desired, and crystal structure and lattice constant must be matched with those of the magnetic layer.

As the nonmagnetic primer layer, Cr, CrTi, CoCr, CrTa, CrMo, NiAl, Ru, etc. may be used.

Film thickness of the nonmagnetic primer layer is preferably in the range of 30–200 nm, or more preferably in the range of 50–150 nm.

The thickness of the magnetic layer is preferably in the range of 50–800 nm, or more preferably in the range of 100–500 nm.

More concretely, the following material may be used as the magnetic layer: Co, Co alloy (CoNi, CoNiZr, CoNbTaZr, etc.), Fe, Fe alloy (FeCo, FeCoNi, FeNiMo, FeAlSi, FeAl, or FeTaN), Ni, and Ni alloy (NiFe). Among these, it is preferable to use FeCo or FeCoNi.

Also, it is preferable to provide a hard carbon protective film such as diamond-like carbon (DLC) on the magnetic layer, or a lubricant layer may be provided on the hard carbon protective film.

As the protective film, it is preferable that a diamond-like carbon film of 5–30 nm and a lubricant are present.

The lubricant plays a role in preventing damage caused by friction when the master carrier and the slave medium are brought into close contact and the deviation caused during the contact process is to be compensated.

The master carrier for magnetic transfer can be produced by the method given below as in the case of the manufacture of a stamper for producing CD-ROM.

On a circular substrate made of quartz, glass, etc. of a predetermined surface roughness, photoresist is coated. On a photoresist layer processed by pre-baking, laser beam modulated to match the servo signal is irradiated while rotating the substrate. A pattern corresponding to the servo signal and extending in radial direction from the center of rotation is formed by exposure on the photoresist over the entire surface of the disk. After development, baking process is performed.

When grooves are formed, laser beam is irradiated to the grooves as in the case of servo signals, and patterns of servo areas and grooves can be formed.

On the substrate where the predetermined pattern has been formed, a thin silver-plated or nickel-plated layer is provided by chemical plating or sputtering method. Using the thin silver-plated or nickel-plated layer as one of the electrodes, nickel is provided on the thin silver-plated or nickel-plated layer by electroforming, and a metal disk is prepared, which has a pattern to be formed when the nickel layer is detached from the substrate.

Next, on a metal disk having the pattern to match the signal, a magnetic layer is provided by vacuum deposition method. The magnetic layer may be formed by vacuum deposition method such as evaporation method, sputtering method, ion plating method, etc. In particular, it is preferable to use the sputtering method.

Next, a carbon film, e.g. diamond-like carbon, may be formed on the magnetic layer by the method such as sputtering.

Or, the metal disk formed by electroforming of nickel may be used as a casting mold, and electroforming of nickel may be performed. By this method, using the metal disk obtained in a single pattern forming process as a base mold, a multiple of master carriers for magnetic transfer can be produced.

As the slave medium to be used in the magnetic transfer method of the present invention, a magnetic recording medium for hard disk using a rigid base material, or a magnetic recording medium for floppy disk using a flexible material as base material may be used. A coating type magnetic recording medium with ferromagnetic metal particles dispersed in a binder, or a metal thin film type magnetic recording medium with ferromagnetic metal thin film formed on the substrate may be used.

More concretely, as the coating type magnetic recording medium, recording medium for Zip (Iomega Inc.), i.e. Zip 100, Zip 250, or magnetic recording medium such as high-density floppy disk called HiFD may be used.

As the magnetic material to be used in the metal thin film magnetic recording medium, Co, Co alloy (CoPtCr, CoCr, CoPtCrTa, CoPtCrNbTa, CoCrB, CoNi, etc.), Fe, or Fe alloy (FeCo, FePt, FeCoNi) may be used. For the purpose of performing satisfactory transfer operation, it is preferable that the material has high magnetic flux density and that it has magnetic anisotropy in the same direction as the magnetic layer of the master carrier for magnetic transfer, i.e. longitudinal direction in case of longitudinal recording, and normal direction in case of perpendicular recording.

Also, it is preferable to provide a nonmagnetic primer layer to give magnetic anisotropy as required—under the magnetic layer, i.e. on a layer closer to the substrate. It is preferable that crystal structure and lattice constant are well matched with those of the magnetic layer.

In the following, description will be given on examples and comparative examples to explain the features of the present invention.

Example 1

On a 3.7 type disk made of synthetic quartz with surface roughness Ra of 0.2 nm, photoresist was coated by spin coating, and this was processed by pre-baking. The thickness of the photoresist after pre-baking was 200 nm. While this disk with photoresist was being rotated, laser beam modulated to correspond to servo signal was irradiated. Then, a pattern corresponding to the servo signal and extending in radial direction from the center of rotation was formed by exposure on a portion to match each frame on circumference on each track. This was developed using an alkali developing solution.

Each of the pattern thus formed was disposed in an area of 0.3 degree with spacing of 10 degrees. The patterns were formed in radial shape with equal spacing of 5 μm in width from the center to the position of 20–40 mm in radial direction. The spacing of the radial lines was set to 0.5 μm at the innermost position of 20 mm in radial direction. Grooves each having width of 100 μm were formed in the data area at a position of 20 mm in radial direction.

After the surface of the photoresist was washed off, a nickel layer of 300 μm was formed by electroforming using the silver-plated layer as electrode. This was detached from the original disk, and a metal disk was prepared, and this was used as a substrate for the master carrier for magnetic transfer.

On the metal disk, a layer comprising a soft-magnetic layer and a FeCo layer (atom ratio 50:50) was prepared by sputtering at 25° C. Sputtering pressure was set to $1.5 \times 10^{-4}$ Pa (1.08 mTorr). Electric power was set to 2.80 W/Cm².

Next, as the slave medium, a coating type magnetic recording medium (Fuji Photo Film Co., Ltd.) for Zip 250 (Iomega Inc.) as commercially available was used. Coercive force Hc of the slave medium was 199 kA/m (2500 Oe).

Initial DC magnetization of the slave medium was performed using an electromagnet system so that peak magnetic field intensity will be 398 kA/m (5000 Oe; two times of Hc of the slave medium). Next, the slave medium processed by initial DC magnetization and the master carrier for magnetic transfer were brought into close contact with each other. Magnetic field of 199 kA/m (2500 Oe) was applied by the electromagnet system, and magnetic transfer was performed.

The slave medium thus obtained was evaluated by the evaluation method given below, and magnetic transfer information was evaluated. The results are shown in Table 1.

EXAMPLE 2

A master carrier for magnetic transfer was prepared by the same procedure as in Example 1 except that a base material with surface roughness of 2.0 nm was used, and evaluation was performed by the same procedure as in Example 1. The results are shown in Table 1.

EXAMPLE 3

A master carrier for magnetic transfer was prepared by the same procedure as in Example 1 except that a base material with surface roughness of 4.6 nm was used, and evaluation was performed by the same procedure as in Example 1. The results are shown in Table 1.

EXAMPLE 4

A master carrier for magnetic transfer was prepared by the same procedure as in Example 1 except that grooves were not provided, and evaluation was performed by the same procedure as in Example 1. The results are shown in Table 1.

EXAMPLE 5

A master carrier for magnetic transfer was prepared by the same procedure as in Example 1 except that a base material with surface roughness of 0.1 nm was used, and evaluation was performed by the same procedure as in Example 1. The results are shown in Table 1.

Comparative Example 1

A master carrier for magnetic transfer was prepared by the same procedure as in Example 1 except that a base material with surface roughness of 0.8 nm was used and the metal disk prepared by the method described in Example 4 was used as a casting mold and a nickel layer was formed by electroforming and this was used as the substrate for the master carrier. This was evaluated by the same procedure as in Example 1. The results are shown in Table 1.

Comparative Example 2

A master carrier for magnetic transfer was prepared by the same procedure as in Example 1 except that a base material with surface roughness of 7.6 nm was used and the metal disk prepared by the method described in Example 4 was used as a casting mold and a nickel layer was formed by electroforming and this was used as the substrate for the master carrier. This was evaluated by the same procedure as in Example 1. The results are shown in Table 1.

Evaluation Methods (1) Surface Roughness Ra

Using optical interference type surface roughness meter (HD2000; WYKO), an objective lens (×50), and an intermediate lens (×0.5), measurement was made on a portion in size of 242×184 μm.

(2) Durability

Contact pressure between the master carrier for magnetic transfer and the slave medium was set to 490 kPa (5 kg/cm²). Contact and detachment were repeated by 1000 times. Then, the surface of the master carrier for magnetic transfer was examined in 50 visual fields selected at random under differential interference type microscope with magnification of ×480. If the number of defects (cracks or worn portions) on the magnetic layer was less than 5 in each of the above 50 visual fields, it was defined as "good". If there were 5 or more worn or cracked portions, it was defined as "no good".

(3) Evaluation of air gaps

A magnetic developing solution (Sigmarker Q; Sigma Hichemical) was diluted by 10 times, and this was dropped on the slave medium prepared for the evaluation of durability. After drying and developing, the change at the end of the magnetic transfer signal was evaluated. Servo areas were examined in 100 visual fields under differential interference type microscope with magnification of ×50. If there were two or more signal dropouts, it was defined as "no good".

(4) Tensile Force

Tensile force required when the master carrier for magnetic transfer was detached from the slave medium was measured.

For the measurement, a center core was attached on the slave medium. After magnetic transfer, the upper portion of the center core was lifted upward in vertical direction. The force required during this lifting was measured using a spring balance. If the tensile force is 4.75 N (480 gf), it was defined as "no good".

(5) Signal Quality

Signal distortion of the transfer signal on the slave medium was determined by an electromagnetic transfer characteristics measuring system (SS-60; Kyodo Electronics). An inductive head with head gap of 0.23 μm and track width of 3.0 μm was used. Reproduced signal (TAA) was measured. If reproduction output was 0.85 mV, it was defined as "good".

TABLE 1

| | Grooves | Average surface roughness (nm) | Durability (number of defects) | Air gaps (number of air gaps) | Tensile force (N) | Signal quality (mV) |
|---|---|---|---|---|---|---|
| Example 1 | Present | 0.8 | 2 Good | 0 Good | 3.2 Good | 0.92 Good |
| Example 2 | Present | 2.0 | 4 Good | 0 Good | 2.8 Good | 0.87 Good |
| Example 3 | Present | 4.6 | 3 Good | 0 Good | 1.6 Good | 0.88 Good |
| Example 4 | Not Present | 0.8 | 4 Good | 3 No Good | 5.6 Good | 0.87 Good |
| Example 5 | Present | 0.1 | 4 Good | 1 Good | 7.3 No good | 0.87 Good |
| Comparative example 1 | Not Present | 0.8 | 63 No good | 0 Good | 1.3 Good | 0.89 Good |
| Comparative example 2 | Not Present | 7.6 | 62 No good | 0 Good | 0.6 Good | 0.74 No good |

By the magnetic transfer method using the master carrier for magnetic transfer of the present invention, stable magnetic transfer can be performed on a disk medium such as hard disk, large-capacity removable disk, large-capacity flexible medium, etc. within short time and with high productivity. No decrease in quality of recording such as signal dropout occurs in the pre-format recording of servo signal for tracking, address information signal, reproduction clock signal, etc.

What is claimed is:

1. A magnetic transfer method for transferring information by bringing a master carrier for magnetic transfer and a slave medium into close contact with each other and by applying a magnetic field for magnetic transfer, said master carrier of magnetic transfer comprising servo areas to be transferred from the master carrier to the slave medium and data areas not to be transferred, both on the same plane.

2. A magnetic transfer method according to claim 1, wherein average surface roughness (Ra) of the data areas of the master carrier for magnetic transfer is in the range of 0.1–5 nm.

3. A magnetic transfer method according to claim 1, wherein there are provided grooves in the data areas.

4. A magnetic transfer method according to claim 2, wherein there are provided grooves in the data areas.

5. A magnetic transfer method according to claim 1, wherein said slave medium is selected from hard disk, large-capacity removable medium or large-capacity flexible medium.

6. A magnetic transfer method according to claim 1, wherein the servo areas occupy 10% or less of the total area of the slave medium, and the data areas occupy 90% or more of the total area of the slave medium.

7. A magnetic transfer method according to claim 3, wherein the grooves are radial grooves, concentric grooves or a combination thereof.

8. A magnetic transfer method according to claim 3, wherein depth of the grooves is within the range of 50 to 800 nm.

9. A magnetic transfer method according to claim 3, wherein width of the grooves is within the range of 10 to 100 μm.

10. A magnetic transfer method according to claim 1, wherein the master carrier comprises a nonmagnetic primer layer and a magnetic layer arranged in this order as a convex portion on a substrate comprising a nonmagnetic material.

11. A magnetic transfer method according to claim 10, wherein the nonmagnetic primer layer comprises a material selected from the group consisting of Cr, CrTi, CoCr, CrTa, CrMo, NiAl and Ru.

12. A magnetic transfer method according to claim 10, wherein the nonmagnetic primer layer has a thickness in the range of 30 to 200 nm.

13. A magnetic transfer method according to claim 10, wherein the magnetic layer comprises a material selected from the group consisting of Co, CoNi, CoNiZr, CoNbTaZr, Fe, FeCo, FeCoNi, FeNiMo, FeAlSi, FeAl, FeTaN, Ni and NiFe.

14. A magnetic transfer method according to claim 10, wherein the magnetic layer has a thickness in the range of 50 to 800 nm.

15. A magnetic transfer method according to claim 10, wherein a hard carbon protective film is further provided on the magnetic layer.

16. A magnetic transfer method according to claim 15, wherein a lubricant layer is further provided on the hard carbon protective film.

* * * * *